Nov. 19, 1963　　　A. G. REYNOLDS　　　3,110,973
LAND SMOOTHER
Filed Feb. 23, 1961　　　　　　　　　　　　3 Sheets-Sheet 1
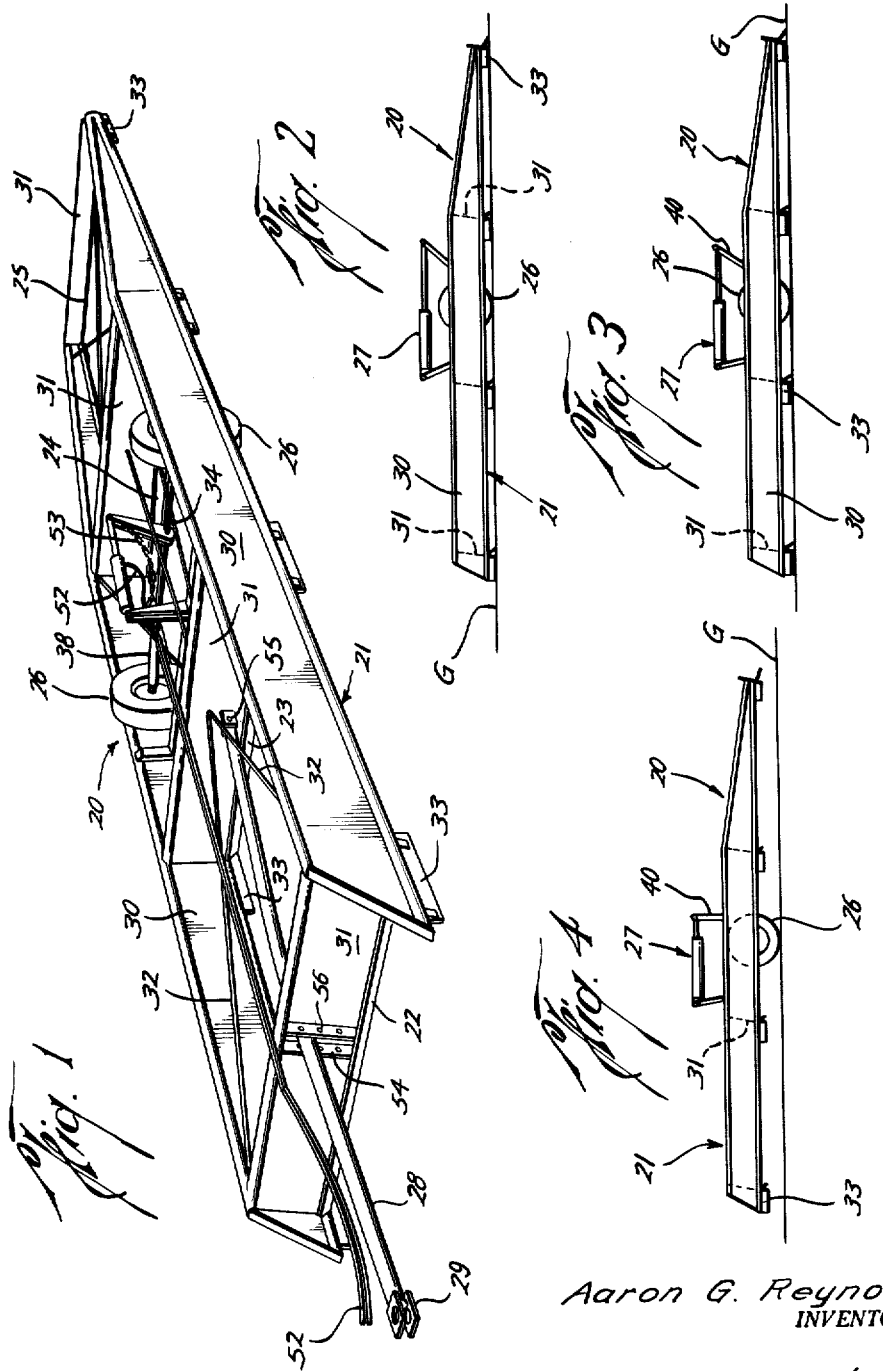
Aaron G. Reynolds
INVENTOR.
BY Browning, Simms, Hyer
& Eickerrott
ATTORNEYS

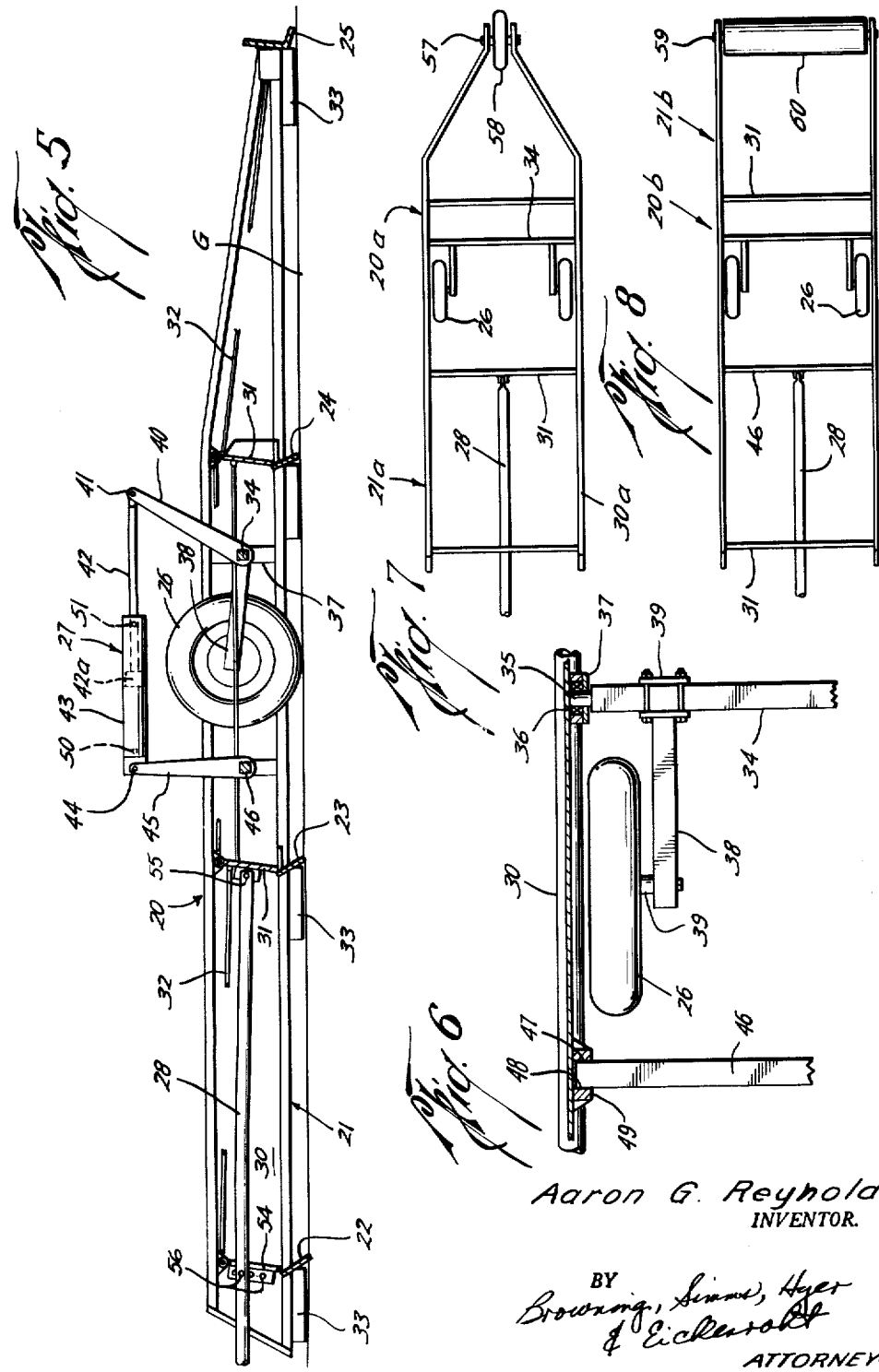

Nov. 19, 1963 A. G. REYNOLDS 3,110,973
LAND SMOOTHER
Filed Feb. 23, 1961 3 Sheets-Sheet 3
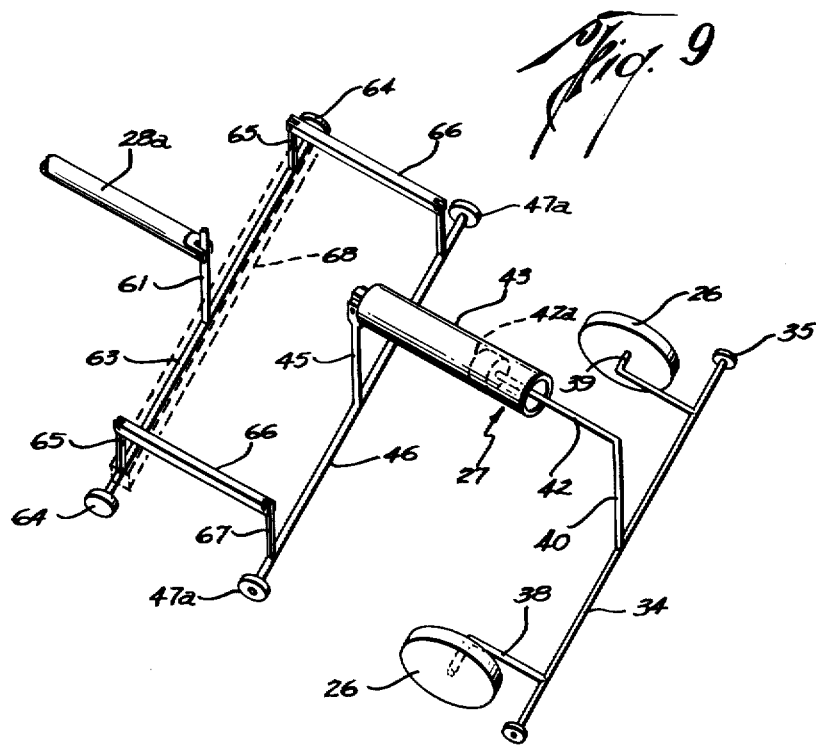
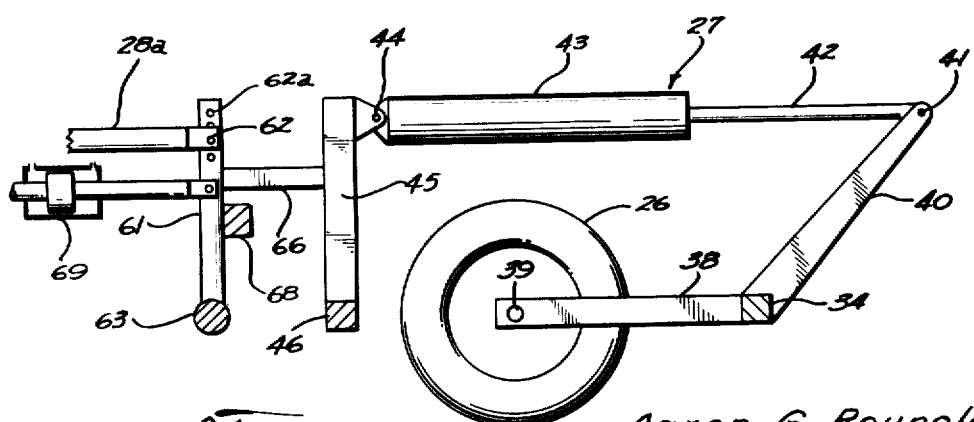
Aaron G. Reynolds
INVENTOR.
BY Browning, Simms, Hyer & Eckenrodt
ATTORNEYS

United States Patent Office 3,110,973
Patented Nov. 19, 1963

3,110,973
LAND SMOOTHER
Aaron G. Reynolds, 512 Baywood, McAllen, Tex.
Filed Feb. 23, 1961, Ser. No. 91,175
11 Claims. (Cl. 37—176)

This invention relates to an improved land leveling implement known as a land smoother.

In a simple and well known form, a land smoother comprises a rectangular wooden frame having three or more blades mounted laterally across it and with their lower smoothing edges arranged in a common surface or plane. This construction is particularly unsuitable for different soil conditions, because the frame may be too light for effective use on hard, cloddy soil and too heavy for use effectively on a soft surface. Also, of course, this form of land smoother is neither maneuverable nor readily transportable.

Although it has been proposed to render such land smoothers more serviceable by providing them with depressable wheels on opposite sides of the frame, this has created a still further problem since, in this latter case, the wheels determine the elevation of or "boss" the lower smoothing edges of the blades. As a result, when the wheels fall into a low place in the surface of the ground being leveled, the blades are bossed too low, and when they ride over a high place, the blades are accordingly bossed too high.

An object of this invention is to provide a land smoother which is effective in different soil conditions, which has substantially uniform draft requirements for any given soil condition, which is readily maneuverable and transportable, and in which the blades boss their own elevation.

Another object is to provide such a land smoother having its blades arranged in a unique fashion to provide optimum smoothing.

A further object is to provide such a land smoother in which wheels on opposite sides of the frame act at least somewhat independently of one another, as, for example, when one drops into a low place or rides over a high place on the ground.

Still another object is to provide a land smoother which is automatically adjustable to provide substantially uniform draft requirements as it is moved over different types of soils as well as relatively immovable obstructions of which would otherwise exceed the power capacity of the towing vehicle or damage the land smoother itself.

Other objects, advantages and features of this invention will be apparent to one skilled in the art upon consideration of the written specification, attached claims and the annexed drawings.

These and other objects are accomplished, in accordance with the illustrated embodiments of the invention, by a land plane having means, such as one or more wheels, supported from the frame for yieldably engaging the ground so as to traverse high and low spots without "bossing" the blades. More particularly, this yieldable support is adjustable to regulate the weight load which is carried by the blades. Thus, for example, when the soil being leveled is hard and cloddy, the yieldable support is adjustable to decrease the force with which the wheels engage the ground and thereby increase the load on the blades. On the other hand, when such soil is soft, the support is adjustable to increase this force and thus decrease the load on the blades.

In its preferred form, this adjustably yieldable support comprises a torque bar which extends laterally of the frame and has spaced-apart arms each to support a wheel. There is an actuator on the frame which connects to the bar intermediate the arms for rotating the bar in opposite directions about its axis to either increase or decrease the torque and thus the force with which the wheels engage the ground. The bar is sufficiently flexible to permit considerable movement between the wheel-supporting arms and the connection of the actuator to the bar so that one wheel is affected only to a minimum extent by the rise or fall of the other wheel. As a result, there is a minimum of opportunity for the wheels to boss the blades, even in the case of substantial differences in the level of the ground engaged by the wheels. Preferably, there is another torque bar which extends laterally across the frame, and the actuator is connected between the bars to thereby increase the yieldable effect of the torque bar upon which the wheels are mounted.

The several blades which extend across the frame have front faces which are tilted forwardly from their lower front faces which are tilted forwardly from their lower ground engaging edges so as to ride over relatively immovable objects on the ground and also to compress and smooth out the soil over which they ride. Inasmuch as the soil being moved by the blades accumulates beneath the front faces thereof, such soil will assume at least part of the load of the plane so that when too much of the soil accumulates in front of the blades, the latter will rise and ride over the soil, rather than continue to accumulate same as would be the case if the front faces were tilted rearwardly. This, of course, contributes toward uniform draft requirements.

In the preferred embodiment of the invention, a pair of these blades are disposed forwardly of the wheels and have their front faces at least approximately equally angularly disposed with respect to the ground, while a third blade rearwardly of the wheels has its front face tilted forwardly at a steeper angle with respect to the horizontal. On an irregular or rough surface, the first two blades take turns cutting and filling the soil so that their functions in leveling the soil will "average out." This action of the first two blades will also compact the soil, and the third blade is more nearly upright in order to cut it. Furthermore, it is not the intention of this third blade to assume any substantial amount of the weight of the plane.

These three blades are followed by a fourth ground engaging element which "reads" the first three in that its ground engaging edge is in the same plane. This last element may comprise a further blade disposed at lesser angle with respect to the ground, or, on the other hand, it may comprise a rotatable member such as a wheel or a roller extending laterally across the frame of the smoother.

There is a slot in a forward upright cross member of the frame, and a tongue or draw bar having its rear end pivoted to another cross member extends forwardly through the slot for connection at its forward end with a towing vehicle. More particularly, the slot extends vertically to permit the tongue to swing freely therein as the vehicle rises or falls with respect to the smoother. Thus, the vehicle will not ordinarily boss the blades of the smoother, even though it may traverse unusually rough terrain.

The draft requirements of the land smoother of this invention are automatically maintained substantially uniform by a draft control mechanism which, in the embodiment above described, connects the tongue and one of the torque bars to rotate such bar for lowering the wheels, and thus raising the blades, upon engagement of one or more of the blades with excessive resistance, such as might be encountered by the blades hanging up on a rock, stump or other fixed object. The same mechanism tends to maintain uniform draft under varying soil conditions.

In the drawings, wherein like reference characters are used throughout to designate like parts:

FIG. 1 is a perspective view from the front and one side of a land smoother constructed in accordance with the present invention;

FIG. 2 is a side elevational view of the land smoother of FIG. 1, but on a smaller scale, and with the wheels and the blades engaging the ground;

FIG. 3 is a view of the land smoother similar to FIG. 2, but wherein the supporting means has been adjusted to increase the force with which the wheels are yieldably urged into engagement with the ground, without, at the same time, raising the blade edges above the ground;

FIG. 4 is another view similar to FIGS. 2 and 3, but wherein the supporting means has been adjusted further to increase this force sufficiently to raise the blades of the smoother above the ground so that the smoother may be transported;

FIG. 5 is a longitudinal sectional view of the smoother on a larger scale;

FIG. 6 is a horizontal sectional view on a still larger scale of part of the wheel supporting means of the smoother;

FIG. 7 is a plan view on the same general scale as FIGS. 2 to 4 of an alternative form of land smoother constructed in accordance with the present invention;

FIG. 8 is a view similar to FIG. 7 of a further alternative form of the invention;

FIG. 9 is a diagrammatic illustration, in perspective, of a draft control mechanism constructed in accordance with the present invention; and FIG. 10 is a side view of the draft control mechanism shown in FIG. 9, as seen along a longitudinal section through the smoother.

With reference now to the details of the above-described drawings, the land smoother shown in FIGS. 1 to 6, and indicated in its entirety by reference character 20, comprises a frame 21 of rigid rectangular construction and having a plurality of blades 22, 23, 24 and 25 extending laterally thereacross for smoothing the ground as the frame is moved thereover. A pair of wheels 26 are supported on the frame by means indicated generally by reference charcter 27 for yieldably and adjustably engaging the ground longitudinally intermediate the blades 23 and 24.

The lower ground engaging edges of the blades 22–25 are disposed in a common plane, as shown in FIGS. 2 to 5, for simultaneously engaging the ground level G. In their normal operating positions, the lower ground engaging surfaces of the wheels 26 are also disposed in this plane so that they "read" the elevation of the lower edges of the blades. However, the wheel supporting means 27 is operable, in a manner to be described hereinafter, to urge the wheels 26 downwardly with sufficient force to raise the frame 21 and thus the blades above the ground level G, as shown in FIG. 4. The smoother is adapted to be moved forwardly, or to the left in the drawings, by means of a tongue or draw bar 28 (FIGS. 1 and 5) having a forward end 29 constructed for connection with a conventional hitch on a towing tractor or other vehicle and pivotally connected at its rearward end to the frame, also in a manner to be described more fully hereinafter.

As shown in FIG. 1, the rectangular frame 21 is made up of longitudinally extending and upright side members 30 interconnected by longitudinally spaced and laterally extending upright cross members 31. As can also be seen from the drawings, the upper and lower edges of the side members 30 and upper edges of the cross members 31 may be enlarged for strengthening the over-all frame. It is also preferred that, as shown in the drawings, the cross members extend upwardly from the upper edges of the blades 22–25, for reasons to be described below. The over-all frame is strengthened and rendered more rigid by means of conventional struts 32 or the like connected diagonally between side and cross members, as shown.

As best shown in FIG. 5, each of the blades 22–25 comprises a relatively thin member having a front face which is tilted forwardly from its lower ground engaging edge. In the preferred form of the invention, the first two blades 22 and 23, which are disposed forwardly of the wheels 26, are tilted at an angle with respect to the horizontal which is somewhat less than the angle of the front face of the next succeeding blade 24 immediately following the wheels 26. The first two blades perform the dual function of moving soil from "highs" to "lows" and supporting weight in order to "read" the elevation of the soil surface at the front extremity of the implement.

On the other hand, the primary function of the blade 24 is to trim to a relatively straight line the surface left by the forward blades 22 and 23. Therefore, it need not be tilted to provide a great deal of weight support, but rather is preferably substantially upright to provide a maximum of cutting action. The rearmost blade 25 may be almost flat with respect to the horizontal, as best shown in FIG. 5, since it is not intended to provide any substantial cutting action, but merely to smooth out the soil and "read" the elevation at the rear extremity of the implement. As will be understood from a description of FIGS. 7 and 8, this same function may be performed by an element other than a blade.

The disposal of cross members 31 at the upper edges of the blades 22–25 provides a further lateral barrier for containing soil which is moved ahead of the blades. As previously mentioned, the forward inclination of the front face of the blades enables some of the load of the frame to be carried by the soil accumulated in front of the blades. Obviously, most of this load is carried by the forward blades 22 and 23 and the rearward blade 25 since they have more inclination than the blade 24. It is contemplated, however, that the cross members 31 may be disposed at least substantially upright, and thus need not bear any of this load. In fact, these side frame members may even tilt rearwardly from their lower edges a slight amount, as best shown in FIG. 5, in order to increase their capacity to accumulate soil.

The soil accumulated in front of the blades and cross members 31 is confined on opposite sides by side walls 33 which extend forwardly from each end of the blades. More particularly, and as best shown in FIG. 5, the lower edges of these side walls engage the ground beneath the lower edges of side frame members 30 and substantially in the same plane as the lower edges of the blades 22–25. As shown in FIGS. 1 to 5, the forward ends of the side frame members 30 may be extended somewhat beyond the forward cross member 31 to provide a support for the side walls 33 on each opposite end of forward blade 22.

A first torque bar 34 of the wheel supporting means 27 extends laterally across the frame 21 intermediate the blades 23 and 24 and is square in cross section, except for its rounded ends 35 rotatably mounted in bearings 36 carried in each opposite side frame member 30 by means of plates 37 (see FIG. 6). Thus, the torque bar 34 is rotatable in opposite directions about its axis laterally or transverse to the forward direction of movement of the frame. An arm 38 is secured by means of a releasable clamp 39 toward each opposite end of the torque bar 34 to mount the wheels 26 substantially adjacent the side frame members 30. More particularly, each arm 38 carries a stub shaft 39 on its outer end for rotatably mounting the wheels about a common axis.

As best shown in FIGS. 1 and 5, the arms 38 extend forwardly and approximately horizontal with respect to the ground level when the wheels are disposed in their normal ground engaging position during operation of the blades. Obviously, upon rotation of the central portion of the torque bar 34 in a counterclockwise direction (as seen in FIG. 5) the force with which the wheels 26 engage the ground will be increased, thereby decreasing the weight of the smoother which is carried by the blades 22–25. On the other hand, upon rotation of the central portion of this torque bar in a clockwise direction, the force with which they are yieldably urged into engagement with the ground G will be decreased, as a result of which the blades will accept a proportionately greater amount of the load of the smoother. As previously described, this adjustment enables the smoother to be adapted for different soil conditions as well as to be operated at different levels of available power.

This rotation is imparted to the torque bar 34 by means of a crank arm or lever 40 connected to an intermediate portion thereof and extending upwardly and rearwardly therefrom. More particularly, this crank arm has a square opening fitting about the corresponding configuration of the intermediate portion of the torque bar 34, as shown in FIG. 5, so that the torque bar rotates with it. The upper free end of the arm 40 is pivotally connected at 41 to an actuator including a rod 42 of a piston 42a slidable within a cylinder 43. The opposite free end of the cylinder 43 is pivotally connected at 44 to the upper end of another crank arm or lever 45 connected at its lower end for rotation with another torque bar 46 which extends laterally across the frame forwardly of the torque bar 34. As distinguished from the first-mentioned torque bar 34, bar 46 has out-of-round opposite ends 47 mounted in similarly shaped openings 48 in plates 49 on each side member 30 to prevent rotation of such ends. As best shown in FIG. 5, hydraulic fluid may be alternately admitted to and withdrawn from opposite sides of the piston 42a by means of connections 50 and 51 on opposite ends of the cylinder 43. These connections have fluid lines 52 which extend therefrom forwardly of the frame, as shown in FIG. 1, for connection with suitable pumping apparatus on the towing vehicle.

Thus, upon the introduction of hydraulic fluid into the connection 51 for withdrawing the rod 42, the crank arms 40 and 45 are drawn toward one another. This, of course, increases the torque in the bars 34 and 46 to thereby increase the force with which the arms 38, and thus the wheels 26, engage the ground. As previously mentioned, the range within which this urging may be increased or decreased is increased by the location of the actuator between the two torque rods 34 and 46. Of course, upon extension of the rod 42 by the admission of hydraulic fluid into the connection 50, this yieldable urging of the wheels 26 into engagement with the ground will be lessened. On the other hand, upon retraction of the rod 42 to a certain extent beyond that shown in FIG. 5, the wheels 26 will be urged downwardly an extent not only sufficient to accept most of the load of the smoother, but further sufficient to actually lift the smoother and the blades up from engagement with the ground G, as shown in FIG. 4. In this latter position, the smoother is readily transportable from one job site to another.

The connection of the crank arms 40 of the wheel supporting means 27 to an intermediate portion of the torque bar 34 enables one end of the bar to flex somewhat with respect to the other. Thus, in the event one of the wheels 26 falls into a low spot or rides over a high spot, the opposite wheel is affected only a small amount. As a consequence, the shifting of weight from one wheel to the other, with a resultant shifting of weight from side to side on the blades, is substantially eliminated.

As shown in FIG. 1, a chain 53 may be connected between the crank arms 40 and 45 so as to limit the outward extension of the rod 42 with respect to the cylinder 43. This will predetermine, for any given chain length, the minimum extent to which the wheels are yieldably urged into engagement with the ground, thereby facilitating field operation of the implement and its transport by maintaining the position of the wheels independently of their hydraulic connections.

As shown in FIGS. 1 and 5, the rear end of the tongue 28 is received through a slot 54 in the front cross member 31 for pivotal connection at 55 to the next cross member. As previously mentioned, this slot is vertically elongated so that the tongue may swing about the pivotal connection 55 without raising or lowering the frame 21. Thus, when the towing vehicle (not shown) connected to the tongue at 29 rises and falls relative to the frame, it will not ordinarily boss the blades. On the other hand, when the smoother is to be transported and the wheels 26 have been lowered, as shown in FIG. 4, the tongue 28 may be fixed against swinging by means of pins (not shown) insertable through aligned holes 56 in opposite sides of the slot 54.

In the alternative form of the smoother shown in FIG. 7, and indicated in its entirety by 20a, the rear end of ahe frame 21a has convergently tapered side members 30a which carry between them a shaft 57 supporting a wheel 58 laterally intermediate opposite sides of the frame. The lower edge of the wheel lies at least substantially in the plane of the lower ground engaging edges of the blades so that, as previously mentioned, it reads the blades 22–24 similarly to the blade 25 of the smoother 20. To facilitate turning, the wheel 58 may be caster-mounted on the side frame members 30a.

Since the wheel 58 provides substantially no smoothing function, smoother 20a has lower draft requirements than the smoother 20. Also, the tapering rear end of the frame 21a facilitates turning of the smoother, particularly adjacent fence lines. On the other hand, as distinguished from the blade 25, the wheel 58 may drop into soft soil and thus not read the elevation accurately.

The alternative form of smoother 20b shown in FIG. 8 has a frame 21b more nearly like the frame 21 of the smoother 20 in that it is rectangular. However, as distinguished therefrom, it has a rearward end which carries a shaft 59 to support a laterally extending roller 60 which, similarly to the blade 25 and wheel 58, engages the ground in the plane of the blades.

The embodiment of the draft control mechanism illustrated in FIGS. 9 and 10 is connected between the wheel supporting means 27 and a tongue or draw bar 28a of a land smoother constructed generally in accordance with the foregoing description. Thus, as can be seen from FIGS. 9 and 10, many of the parts adjacent such mechanism have reference characters corresponding to those shown in FIGS. 1 to 8.

More particularly, the draft control mechanism includes an upright post 61 pivotally connected toward its upper end by means of a pin 62 to the rear end of the tongue 28a. The lower end of post 61 is, in turn, fixedly connected to an intermediate portion of a shaft 63 which extends laterally across the frame and is rotatably mounted at its opposite ends in any suitable manner within the frame, as indicated diagrammatically at 64 in FIG. 9. Thus, the shaft 63 is caused to rotate about its axis as the tongue 28a is moved forwardly and rearwardly.

There are upright posts 65 (see FIG. 9) fixed to the shaft 63 toward its opposite ends, and preferably equally spaced from the upright post 61. The upper end of each post 65 is pivotally connected to a longitudinally and rearwardly extending bar 66, each of which is in turn pivotally connected at its rearward end to the upper end of a downwardly extending post 67. Each of the last-mentioned posts 67 is fixed to the forward torque bar 46 for rotating same in response to its own rotation through ahe above-described linkage connecting it with the laterally extending shaft 63. For this purpose, however, and as distinguished from the previous description, the opposite ends of torque bar 46 are rotatably mounted from the sides of the frame, as indicated diagrammatically at 47a. As will be apparent from the drawings, the posts 65 and 67, together with the bars 66, form in effect a parallelogram linkage between the shaft 63 and the torque bar 46.

More particularly, the upright posts 67 are connected to torque bar 46 toward its opposite ends and equally spaced from opposite sides of the arm 45. This spacing of each parallel linkage from the arm connected to the actuator will permit a certain amount of flexing of the torque bar 46 intermediate its connection with the upright posts 67 and the arm 45. Obviously, as this flexure increases due to forward extension of the tongue 28a, the flexure imparted to the intermediate portion of the torque bar 46 will increase so as to impart a corresponding counterclockwise rotation (see FIG. 10) to the arm 45. This will, of course, further increase the force with which the means 27 urges the wheels 26 into engagement with the ground. On the other hand, rearward movement of the tongue 28a will cause an oppositely disposed flexure in the torque bar 46, thereby resulting in a clockwise rotation of the arm 45 which will, of course, lessen the force with which the wheels 26 are forced into engagement with the ground.

Thus, when the blades of the land smoother encounter a relatively immovable object, and particularly one which might cause damage to the smoother or to the towing vehicle, the mechanism above described will, by virtue of the forward extension of the tongue 28a with respect to the remainder of the smoother, cause the wheels to be moved downwardly for lifting the blades above such objects. Also, since the tongue 28a will have a tendency to be extended forwardly as the amount of soil accumulated by the blades increases, this control mechanism will tend to make the draft requirements of the smoother relatively constant by continually regulating the force on the wheels in accordance with the resistance of such soil.

A bar 68 (shown in broken lines in FIG. 9 for purposes of clarity) is supported by the frame at its opposite ends for extension laterally thereacross rearwardly of posts 65. Thus, this bar provides a stop or limit on the degree to which the wheels 26 may be loaded upon any given extension of the rod 42. The support of the bar 68 may be longitudinally adjustable in any suitable manner so as to in turn limit the maximum urging of the means 27. This bar is therefore useful in locating the wheels 26 when the implement is to be transported. That is, when the rod 61 is engaged against stop bar 68, the means 27 may be contracted in order to lower the wheels independently of the draft tongue 28a.

As shown in FIG. 10, the post 61 has a number of vertically spaced-apart holes 62a for receiving the pin 62 connecting the tongue 28a to the post. Thus, the leverage imparted by the tongue to the parallelogram linkage may be adjusted, as desired. Also, a damper, indicated diagrammatically at 69 in FIG. 10, may be connected between the post and a cross member of the frame (not shown) in order to absorb the shock of the movement of the tongue on the draft control mechanism.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A land smoother, comprising a frame movable forwardly in a longitudinal direction over the ground, a plurality of ground engaging elements including a pair of blades extending laterally across the frame, each of said blades having a front face which is tilted forwardly from its lower edge with the lower edges of both blades fixed in a common plane, wheels on opposite sides of the frame, a torque bar extending laterally of the frame and pivotally mounted thereon, arms on the bar each supporting one of said wheels, a lever arm connected to an intermediate portion of the bar, and an extendible and retractable actuator pivotally connected between the frame and lever arm for rotating said bar about its axis.

2. A land smoother of the character defined in claim 3, including another torque bar extending laterally across the frame and mounted at its opposite ends on the sides of the frame, and a lever arm on an intermediate portion of the other torque bar connected to the end of the actuator opposite the end thereof connected to the first-mentioned lever arm.

3. A land smoother of the character defined in claim 2, wherein said actuator comprises a fluid actuated cylinder and piston pivotally connected between said lever arms.

4. A land smoother, comprising a frame movable forwardly over the ground, ground engaging elements including a plurality of blades extending across the frame transversely of its forward movement, each blade having a front face which is tilted forwardly from its lower edge and a lower edge which is fixed in a common plane, support means for the frame, and means for maintaining the support means in yieldable engagement with the ground with a force which is adjustable to regulate the weight load carried by the blades.

5. A land smoother of the character defined in claim 4, wherein a pair of said blades disposed forwardly of the support means have their front faces at least approximately equally angularly disposed and tilting forwardly from their lower edges at a moderate angle with respect to the ground, a third blade rearwardly of said support means as its front face tilting forwardly from its lower edge at a greater angle with respect to the ground than said pair, and a fourth blade rearwardly of the third blade has its front face tilting forwardly from its lower edge at a lesser angle with respect to the ground than said front pair.

6. A land smoother of the character defined in claim 4, wherein a pair of said blades disposed forwardly of the support means have their front faces at least approximately equally angularly disposed and tilting forwardly from their lower edges at a moderate angle with respect to the ground, a third blade rearwardly of said support means has its front face tilting forwardly from its lower edge at a greater angle with respect to the ground than said pair, and a rotatable member supported on the frame for engaging the ground rearwardly of the third blade and in substantially the same plane as the lower edges of said blades.

7. A land smoother, comprising a frame adapted for movement forwardly over the ground and including substantially upright longitudinally extending side members interconnected by substantially upright laterally extending cross members, ground engaging elements carried by the frame including a blade on the lower edge of each cross member and extending laterally coextensive therewith for engaging with the ground along its lower edge, each of said blades having a front face which is tilted rearwardly from its upper edge to its lower edge and a lower edge fixed in a plane common to the lower edges of all said tilted blades, and at least one wheel carried by the frame, means for maintaining said wheel in yieldable engagement with the ground, and means for adjusting the force with which said wheel is so maintained.

8. A land smoother, comprising a frame adapted to be moved longitudinally over the ground in a forward direction, a plurality of ground engaging elements having lower edges fixed in a common plane and including a pair of blades extending laterally across the frame, each of said blades having a front face which is tilted forwardly from its lower edge, means for supporting the frame on the ground, and means on the frame for maintaining the supporting means in yieldable engagement with the ground and adjusting the force with which said supporting means is so maintained so as to regulate the weight load which is carried by said blades.

9. A land smoother of the character defined in claim 19, wherein said ground engaging elements include a third element disposed rearwardly of said pair of blades.

10. A land smoother of the character defined in claim 9, wherein said third element comprises a third blade which is disposed almost flat with respect to the ground.

11. A land smoother of the character defined in claim 9, wherein said third ground engaging element comprises a roller rotatable about a transverse axis.

References Cited in the file of this patent

UNITED STATES PATENTS

| | | |
|---|---|---|
| 1,462,577 | Jamieson | July 24, 1923 |
| 1,845,324 | Noffsinger et al. | Feb. 16, 1932 |
| 2,227,762 | Ronning | Jan. 7, 1941 |
| 2,490,311 | Levesque Du Rostu | Dec. 6, 1949 |
| 2,535,441 | McGehee | Dec. 26, 1950 |
| 2,646,850 | Brown | July 28, 1953 |
| 2,650,441 | Shumaker | Sept. 1, 1953 |
| 2,720,716 | White | Oct. 18, 1955 |
| 2,732,640 | Kirchner | Jan. 31, 1956 |
| 2,786,285 | Lindbeck | Mar. 26, 1957 |
| 2,881,540 | Sprague | Apr. 14, 1959 |
| 2,886,906 | Moses | May 19, 1959 |

UNITED STATES PATENT OFFICE
CERTIFICATE OF CORRECTION

Patent No. 3,110,973                        November 19, 1963

Aaron G. Reynolds

It is hereby certified that error appears in the above numbered patent requiring correction and that the said Letters Patent should read as corrected below.

Column 7, line 74, for the claim reference numeral "3" read -- 1 --; column 8, line 26, for "as" read -- has --; same column 8, line 73, for the claim reference numeral "19" read -- 8 --.

Signed and sealed this 5th day of May 1964.

(SEAL)
Attest:
ERNEST W. SWIDER

Attesting Officer

EDWARD J. BRENNER
Commissioner of Patents